Figure 1:
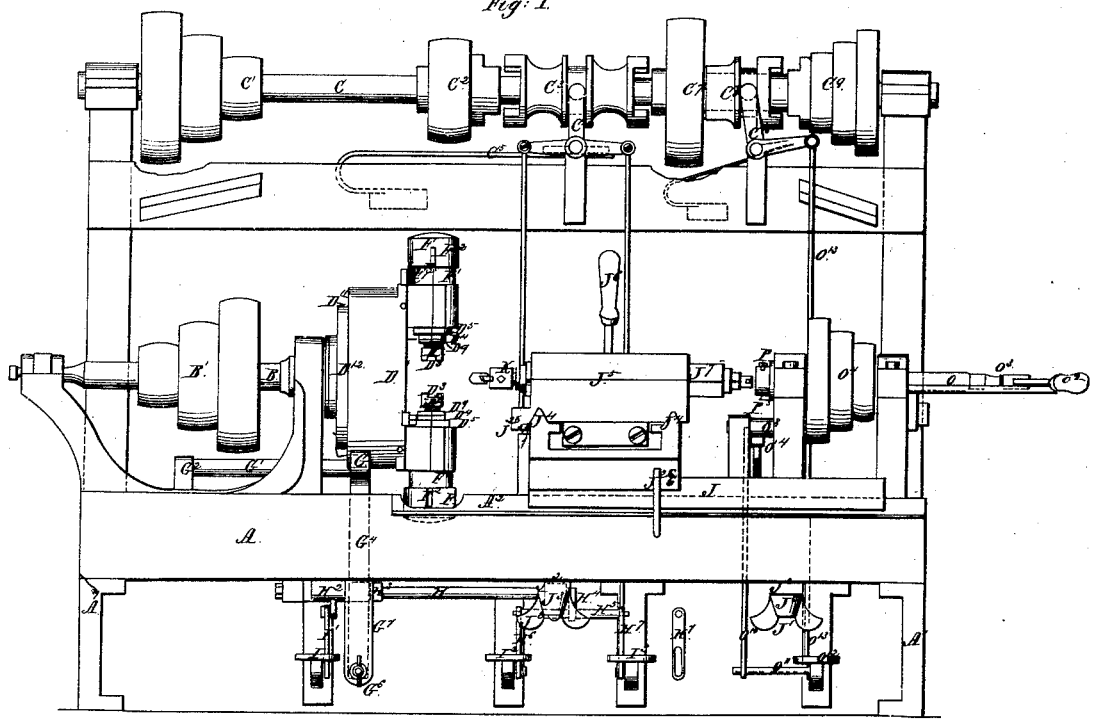

Sheet 1, 2 Sheets.

J. W. Lyon.
Finishing Gas Fittings.

Nº 30,536. Patented Oct. 30, 1860.

Witnesses:

Inventor:

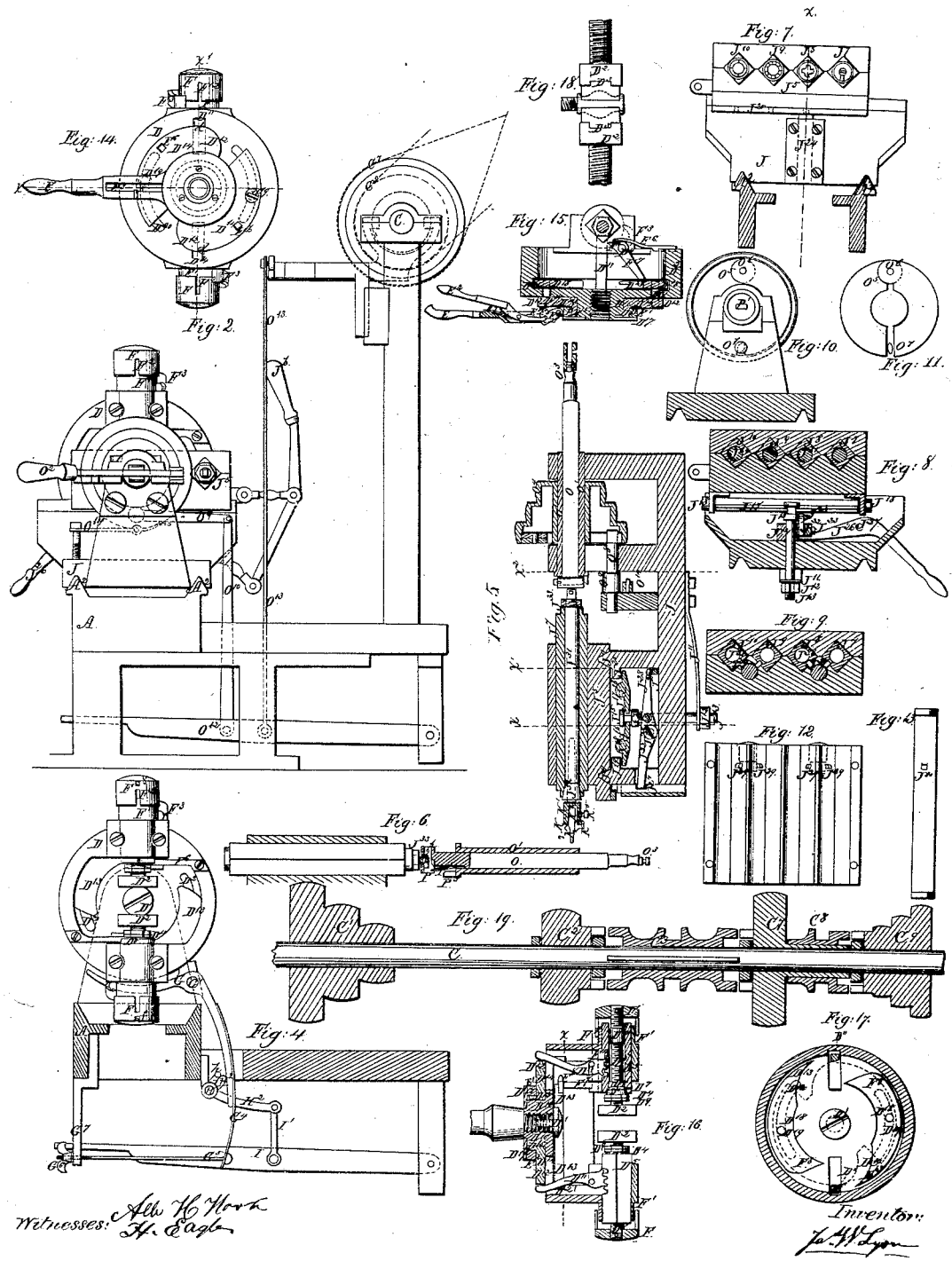

UNITED STATES PATENT OFFICE.

JAMES W. LYON, OF BROOKLYN, NEW YORK.

MACHINE FOR FINISHING GAS-FITTINGS.

Specification of Letters Patent No. 30,536, dated October 30, 1860.

*To all whom it may concern:*

Be it known that I, JAMES W. LYON, of the city of Brooklyn, in the county of Kings and State of New York, have invented a certain new and useful Machine for Finishing Gas-Pipe Fittings and other Similar Purposes; and I do hereby declare that the following is a full and correct description thereof, reference being had to the drawings annexed and to the letters of reference thereon.

My said machine is a drilling, turning and screw cutting machine, and is more especially adapted and designed for making screw joints on brass or composition fittings or connections, stop cocks, &c., such as are used in chandeliers and other gas fixtures. These screw joints are frequently of different sizes on the same fitting for the purpose of connecting pipes of different diameter. Also upon some fittings it is necessary to make both external and internal screw joints. The symmetry of gas fixtures depends in great measure upon the accuracy with which these joints are made in line or at angles with each other. A machine capable of making the joints accurately in line or at angles and of different sizes on the same fitting has long been an object in the manufacture of gas fittings and several machines have been made and patented for this purpose. In one the fitting is clamped in a stationary vise and operated on simutaneously at different points by rotating cutting tools sustained, moved and directed by mandrels at angles with each other; and in another the fittings are secured in vises at points on the periphery of a chuck rotating on a vertical spindle and are in turn presented to the action of rotating cutting tools sustained by horizontal mandrels which have only a rotary and a longitudinal motion and have no capacity for shifting so as to change their position relatively to the axis of the chuck. Now apart from the defects of these machines arising in the first mentioned from the difficulty of maintaining a number of converging cutting tools exactly in their proper line of travel and in the second from the difficulty of chucking the blank fitting accurately on the periphery of the vertical chuck and the liability of such a carrier to present the blank inaccurately to the cutting tools and in both from absence of any provision for alternate use of drills and taps except changing and adjusting the taps and drills in the same mandrel at each operation, they both hold the fitting in a fixed position while drilling or facing it instead of rotating it which latter is by far the best mode of operating on soft metal with turning tools.

My said machine is so constructed and arranged that taps and dies previously adjusted can be used alternately with the drilling and facing tools without removing the fitting from the chuck until finished simply by shifting the mandrels so as to bring either tool in front of the fitting and also has the capacity of rotating either the fitting or the cutting tools at pleasure of the operator which is a great advantage in a machine where taps and dies alternate with turning tools.

It consists of a chuck suitable for holding the fitting mounted on a horizontal lathe spindle and so arranged with relation to its driving power that it may be rotated in opposite directions, or, when not rotating, held in a fixed position, except when released for the purpose of chucking the blank fitting, in combination with a series of turning and drilling and screw cutting tools sustained, guided and moved by horizontal parallel mandrels arranged in bearings in a sliding carriage which is moved transversely across the bed of the machine for the purpose of bringing the proper mandrel and tool in line with the axis of the spindle and chuck, the chuck having the capacity of turning its jaws so as to present the fitting to the action of the tools in such manner as to make the screw joints at any required angle in a horizontal plane common to all the joints without releasing the fitting from the jaws, and the mandrels operating the cutting tools being so arranged in combination with a driver as to be rotated while being moved toward the fitting or simply moved longitudinally without being rotated, at pleasure of the operator; thus enabling the operator after having once arranged the chuck to receive a particular style and character of fitting and adjusting the proper cutting tools to the several mandrels, to present successively the proper part of the fitting to the proper tool and complete the operation of forming all the screw joints without removing the fitting from the chuck until finished, and to repeat the operations of the various tools upon successive fittings of the same pattern without other exercise of skill than is necessary to secure the fitting in the dies between the jaws of the chuck and to bring in action against it successively the various tools held by the mandrels.

Figure 3:
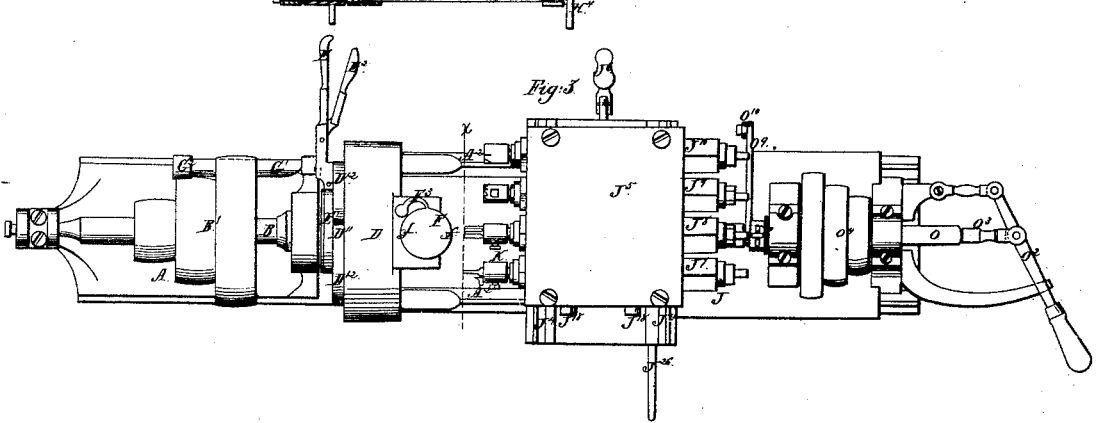

Figure 1 of the drawings represents a front elevation of the machine; Fig. 2 an end view; Fig. 3, a plan view; Fig. 4, section through red line $x$ Fig. 3; Figs. 5 and 6, sections through red line $x$ Fig. 7; Fig. 7, side view of sliding carriage showing front view of tools; Fig. 8, section through red line $x$ Fig. 5; Fig. 9, section through red line $x'$, Fig. 5; Fig. 10, section through red line $x^2$, Fig. 5; Fig. 11, detached view of brake in the step cone driver pulley, Figs. 5 and 10; Fig. 12, plan view of mandrel bearings in lower section of sliding bed showing latches; Fig. 13, detached view of mandrel showing latch hole; Fig. 14, back view of chuck; Fig. 15, section through red line $x$, Fig. 14; Fig. 16, section through red line $x'$, Fig. 14; Fig. 17, section through red line $x$, Fig. 16; Fig. 18, detached view of jaws of chuck and dies on larger scale showing mode of holding the fittings; Fig. 19, section of countershaft with clutches and pulleys.

Letter, A, represents the frame or shears of the machine supported by legs A' which also support a table behind the machine.

B, is a lathe spindle, mounted in heads cast on the bed in the usual manner, and driven by step cone pulley, B', from the step cone pulley C' on the countershaft C overhead.

The first part of my invention relates to the means of holding and presenting the fitting to the action of the cutting tools and consists in several improvements in the construction and arrangement of the chuck, first, in constructing the jaws of the chuck so as to turn on axes at right angles with the axis of the chuck for the purpose of presenting the different parts of the fitting to the action of the cutting tools without removing it from the chuck; second, in combining with the jaws a means of adjusting them relatively to the axis of the chuck and independent of the clamping mechanism so far as their relative adjustment is concerned; third, in combining with the jaws a means of clamping and locking them together upon the fitting at one operation; fourth, in combining with the chuck a wrench not removable from the chuck and used for the purpose of actuating the cams belonging to the clamping mechanism; fifth, in combining with the jaws, index plates, and self acting detents, so arranged as to determine accurately the presentation of the proper point of the fitting to the cutting tools so as to insure the joints being made in line or at the required angles to each other; sixth, in combining with the self acting detents wedges or cams connected with the clamping mechanism or arranged in any suitable manner for the purpose of locking the detents in the index slots so as to prevent the jaws from turning axially when the cutting tools are acting on the fitting.

The above mentioned improvements are illustrated in section by Figs. 14, 15, 16, and 17.

Letter D represents the body of the chuck being a rimmed circular plate of metal provided with a hub with a screw hole in the center by which it is screwed to the spindle in the usual manner and prevented from drawing off when the motion is reversed by the left handed screw bolt D' which is screwed into the end of the spindle, its head taking against the surface of the chuck.

$D^2$, $D^2$, are the jaws of the chuck; $D^3$, $D^3$, recesses in the jaws fitted to dies (as shown in Fig. 18) which correspond to the configuration of the fitting which is generally of an ornamental character. The dies may be fastened to the jaws by screws or keyed in the recesses.

Letters $D^4$, $D^4$, are conical screw nuts, fitted to reverse conical seats in the lower end of the hollow square sliding bars, $D^5$, and are confined therein by grooves, $D^6$, and confining pins, $D^7$, and operate the jaw screws $D^8$.

$D^9$, $D^9$, are jam nuts for the purpose of preventing the jaw screws from turning in the conical screw nuts when adjusted leaving the jaw screws and the conical screw nuts free to turn as one piece in the conical bearings when a fitting is clamped between the jaws. A blank $D^{10}$ is left on each of the jaw screws for the purpose of a bearing surface.

In the above described construction the same parts exercising different functions are employed both in turning and in adjusting the jaws, but this construction may be varied as hereafter shown.

Letters $D^{11}$, $D^{11}$, are toothed sector levers which gear into toothed racks cut on one of the edges of the square sliding bars $D^5$ and are actuated to release and close the jaws upon the fitting, and when closed to lock them so as to prevent them from releasing while the chuck is in motion or the fitting operated on by the cutting tools, by the cams, $D^{12}$, and, $D^{13}$. The cams, $D^{12}$, which act on the levers to close the jaws are cut in the periphery of a circular plate $D^{14}$, provided with a hub $D^{15}$ fitted to a shoulder bearing $D^{16}$ on the outside of the hub of the chuck on which it turns freely being kept in place by a collar $D^{17}$ fast to the hub of the chuck. The cams, $D^{13}$, which act to open the jaws are formed on the segmental plates, $D^{18}$, within the chuck, which are attached to the exterior cam-plate $D^{14}$ by the screw bolts $D^{19}$ so that both exterior and interior cam-plates move together as one piece, the segmental slots $D^{20}$ in the chuck plate permitting sufficient rotary motion and acting as guides in connection with the recess groove $D^{21}$ at the bottom of the rim. Besides being adjusted relatively to each other and independently of the clamping operation for the purpose of centering the fitting in the chuck the jaws should also be adjusted at such distance from each other by the adjusting screws, that when in turning the cams for the purpose of clamping the jaws upon the fitting, the parts of the cams, $D^{12}$, designated by the letter, $d$, and which are nearly concentric with the axis, reach the arms of the levers the jaws are pressed tightly on the fitting between them, so that these parts of the cams can perform their office which is to give the final pinch and lock the jaws.

Letter E represents the handle of the cam-wrench provided with a collar $E'$ which is fitted to and turns freely on the shoulder bearing formed on the outside of the hub of the cam-plate and is confined thereto by the fixed collar, $D^{17}$.

$E^2$, is an actuating lever turning freely on a confined fulcrum in the slot, $E^3$, and which actuates the pallet, $E^4$, which swings on a pin at the end of the slot and is provided with a tooth, $E^5$, corresponding with the holes, $E^6$, in the side of the cam plate, $D^{14}$. The toothed pallet or latch is kept back within the slot by the action of the spring $E^7$, on the lever $E^2$, leaving the chuck free to travel without carrying the wrench around with it. To prevent the friction of the bearing from throwing over the wrench to the injury of the operator a guard may be attached to the headstock extending in front of the wrench so as to intercept it if thrown forward by the friction but if made to fit loosely the wrench will not require it. When necessary to move the cams for the purpose of clamping or unclamping the jaws or locking the index detents the operator grasps the handle and lever pressing the tooth against the side of the cam-plate and moves the wrench around until the tooth latches into the hole in the cam-plate.

Letters, F, represent hollow cylindrical heads secured to end of the jaw screw spindles, $D^8$, and fitted to guides $F'$, projecting from the lugs and caps which inclose the sliding bars, $D^5$. The peripheries of the heads F are divided into four equal parts by the slots $F^2$ making index or division plates whereby the position of the fitting may be determined accurately at four different points.

$F^3$, $F^3$, are self acting catches or detents fast to the stems, $F^4$, which are fitted to and extend through holes drilled down through the back part of the lugs and turn freely therein and have toes $F^5$ attached at the opposite ends on which are flat surfaces pressed against by springs, $F^6$, which act to keep the detents pressed into the slots or when thrown out of the slots by turning the jaw spindles to press the detents against the surface of the index so as to fall into the next slot. One side of the tooth part of the detent fitting into the index slots is inclined for the purpose of permitting the motion of the indexes and jaw spindles in one direction when only controlled by the pressure of the spring. The fitting being clamped between the jaws the indexes and jaws are turned by a pin and collar wrench slipped over either head the pin taking into notches, $f$, on the heads the opposite jaw and index going with it being connected by the fitting clamped between the jaws. The four slots permit joints to be made accurately opposite to or at right angles with each other. Should joints at angles other than right angles be required other divisions in the index will have to be made.

Letters $F^7$, $F^7$, are arms fast to the stems attached to the detents. The ends of the arms are faced to fit inclined surfaces or wedges, $F^8$, on the ends of the segmental cam-plates, $D^{18}$, which are so arranged relatively to the cams for releasing and clamping the jaws that when the jaws are clamped and locked together the inclined surfaces $F^8$ are in contact with the ends of the arms attached to the detents and prevent the detents from lifting out of the slots in the indexes. When necessary to release the detents for the purpose of turning the jaws to change the presentation of the fitting to the cutting tools, the cam plates can be turned sufficiently for that purpose without releasing the fitting in the jaws.

Formal changes in the construction of the various parts may be made without changing the number of functions necessary to be performed by the chuck and without changing substantially the means above described by which the functions are performed as for instance, for and in place of the square sliding bars, with rack teeth cut on one of the edges, round bars may be substituted with a series of rings cut on their circumference and in that case the jaws fastened to square bars sliding in square bearings within the round sliding bars, and the heads or indexes attached to the outside round bars, the inner square bars attached to the jaws being adjustable by a screw secured to the head by a groove and confining pin and actuating the square bars by operating an internal screw in the end of the same. In this form the outside bars or mandrels would both turn and clamp the jaws, and the inner only adjust them, whereas in the construction shown the inner spindles turn and adjust the jaws and the outer merely clamp them. The indexes and self acting detents may be varied also in construction also the arrangement of the cam with the detents for locking them but so long as they are self acting and locked by a wedge acting in concert with the mechanism for locking the jaws they are substantially the same. This part of my invention also consists in combining the above described improvements together in a chuck.

The second part of my invention consists in combining a friction brake directly with the chuck. The object of applying the brake directly to the chuck instead of applying it to a pulley on the spindle, as in the machine for finishing plugs for stop cocks, for which Letters Patent of the United States were issued to me March 6th, 1860, is to arrest the chuck and spindle more immediately without the same liability of straining the spindle which would occur from the considerable weight and velocity of motion of the chuck.

Letter G represents the brake. It is fast to the shaft, G', which turns in bearings, $G^2$, $G^3$, on the bed of the machine behind the head stock. The brake is in the form of a bent lever, the part fitted to the periphery of the chuck being lined with leather. The other end has a spring $G^4$ fast to it and connected to the end of a rod $G^5$ the other end having a screw cut on it and fitted to an adjusting thumb screw nut $G^6$ which takes against the front face of the standard or projection $G^7$ on the front of the bed which has a hole through which the rod $G^5$ passes. This adjustment answers two purposes: first, to arrest the rotation of the chuck and hold it in a fixed position when necessary to apply rotating tools, and second to adjust with sufficient accuracy the friction applied to the chuck so that when using taps and dies with the rotating driver the chuck will be held sufficiently to cut the screw thread and yet yield when necessary to prevent stripping the screw thread or breaking the dies or taps. The clutch is released from the action of the brake by the action of the cam H' which turns freely on the shaft H and rests against the spring.

I is a treadle connected by the link I' with the lever $H^2$ which turns freely on the shaft H and has its small arm, $h$, crooked over so as to take against the upper side of the cam H'. This arrangement is for the purpose of enabling the operator to relieve the chuck from the pressure of the brake when necessary to move the chuck by hand for the purpose of adjusting &c. This part of my invention further consists in a means of relieving the chuck from the action of the brake when motion in either direction is communicated to the spindle.

Letters $I^2$, $I^3$, are treadles connected by jointed rods with the arms of the forked clutch shifter, $C^4$, which is maintained in a vertical position, when not acted on by the treadles, by the spring, $C^5$, which acts against the horizontal bar $C^6$ attached to the shifter.

$C^2$ is a pulley loose on the counter shaft, C, and driven by a straight band from a pulley on a main or driving shaft.

$C^7$, is a pulley fast to the sleeve and clutch coupling $C^8$ which runs loose on the counter shaft C and is driven by a cross band from a pulley on a main or driving shaft and in a reverse direction to the motion of pulley $C^2$.

$C^3$, is a clutch coupling which slides on the counter shaft by a feather and spline and is controlled by the shifter, $C^4$.

$H^3$ is a dog secured to the shaft H by a set screw and provided with a crooked arm, $h'$, which takes against the upper side of the cam H'. The shaft H turns in bearings secured to the underside of the bed A and has a crank arm $H^4$ fast to the end which connects by means of the arms, $H^5$, and slotted links, $H^6$, $H^7$, with the treadles, $I^2$, and, $I^3$, By this arrangement when either of the treadles are depressed for the purpose of imparting motion to the spindle and chuck, the shaft H is partly turned around and the dog, $H^3$, acts on the cam H' which acting against the spring relieves the chuck from the pressure of the brake.

The third part of my invention relates to the mechanism whereby the tools are brought to their proper place of action and sustained moved and directed in a previously determined and proper line of travel to perform their several operations on the fitting held in the chuck. It consists, primarily, in combining with a carriage arranged so as to slide transversely to the axis of the spindle and chuck, and across the bed of the machine, a series of parallel mandrels, which slide in bearings in the sliding carriage, and sustain proper cutting tools, the line of travel of the carriage being so determined with reference to the axis of the spindle and chuck, and the axes of the mandrels, that simply by moving the carriage forward and back a sufficient distance the axis of each mandrel is brought in line with the axis of the chuck and spindle; secondly, in the combination of a division plate, self acting clamp, and releasing lever with the sliding carriage and its bed whereby the movement of the sliding carriage is measured and divided, step by step, into as many parts as there are mandrels, and each part corresponding exactly with the distance from center to center of the mandrels respectively, and the carriage arrested and clamped to the bed only when the axis of a mandrel is in line exactly with the axis of the chuck and spindle, the releasing lever enabling the operator to release the clamp in order to move the carriage back and forth to bring the axis of the desired mandrel in line with the axis of the chuck; thirdly, in a series of self-acting latch bolts in combination with the mandrels and bearings for the purpose of arresting the back motion of the mandrel when drawn back to the point where it should be released from the driver; fourthly, in constructing the mandrels in two parts, exterior and interior, one of the parts say the exterior constructed and arranged so as only to slide longitudinally in its bearings and the other part say the interior constructed and arranged so as to carry the tool, and be carried by the exterior mandrel and also to have the capacity of rotating when required both parts being so arranged with relation to each other and to the driver by which they are moved that they act as one whether rotating or not when in action. The object of this arrangement of parts is to save the wear of bearing surfaces, and consequent imperfect action of the machine, which would result from the grinding action of a mandrel on its bearing surfaces which had both motions acting at the same time on the same bearing surfaces.

Letters $A^2$, $A^2$, are parallel longitudinal V flanches or guides projecting upward from the main bed, A, and fitted to corresponding V grooves in the underside of the bed, J, which is movable longitudinally on the guides for the purpose of accommodating the position of the sliding carriage, $J^5$, and tools to the projection of the ends of different fittings. It is secured to the bed by clamps in the ordinary manner, letter $J'$ (Fig. 1), being the ends of screws fast at the other end in the underside of the bed, $J^2$, cross bars, $J^3$, screw-nuts.

Letters $J^4$, $J^4$, are parallel V guides at right angles to the vertical plane and parallel with the horizontal plane of the axis of the chuck and spindle, and formed on parallel flanches projecting upward from the bed, J, and extending in length a little in front of and behind the bed.

$J^5$, is the sliding carriage fitted by reverse V bearings on its underside to slide on the guides $J^4$, and for convenience is moved back and forth by the hand lever $J^6$.

Letters $J^7$, $J^8$, $J^9$, $J^{10}$, are square sliding mandrels fitted to parallel V bearings in the sliding carriage, the axes of the mandrels being in the horizontal plane of the axis of the spindle and chuck and parallel with the axis of the spindle and chuck.

Letter, $J^{11}$, represents a spring secured to the under side of the bed J, and acting against a screw nut $J^{12}$, on the lower end of the vertical rod, $J^{13}$, which slides in a vertical bearing through the bed, J, and the rib $J^{14}$, on the upper face of the bed and is provided with a circular head $J^{15}$, having a groove around its periphery which admits the inner edges of the rectangular bars or plates, $J^{16}$, and, $J^{17}$, which extend the length of the sliding carriage nearly and have a limited motion on the centers $J^{18}$ and when subject to the action of the spring through the rod and grooved head, press with the upper surface of their outside edges against the lower side of the flanches, $J^{19}$, and, $J^{20}$, making a pair of powerful clamps.

The vertical rod, $J^{13}$, acts through a short link, $J^{21}$, upon the lever $J^{22}$, which turns freely on the stud $J^{23}$, and actuates the vertical latch bolt $J^{24}$, which moves freely in a slide at the side of one of the guides $J^4$, of the sliding carriage. This latch bolt has a square end and is fitted to square notches in a division plate $J^{25}$, which is fast to the lower side of the sliding carriage. These notches are at the same distance from each other as the axes of the mandrels and so arranged that when any mandrel is in line with the axis of the chuck and spindle the latch bolt slips into the notch in the division plate directly under the mandrel and permits the clamping plates to act under the pressure of the spring against the flanches $J^{19}$, $J^{20}$.

$J^{26}$, is a hand lever used for the purpose of releasing the sliding carriage from the action of the clamps. When pressed down it turns freely on a fulcrum pin, $J^{27}$ and acts on the under side of the arm, $J^{28}$, of the lever, $J^{22}$, and through the link upon the vertical rod, $J^{12}$, releasing the clamp and at the same time withdrawing the latch bolt from its notch so that the sliding carriage can be moved. When the carriage is moved a little the hand lever may be released because the latch bolt being kept down by the plane surface between the notches of the division plate prevents the clamps from acting until the next notch reaches the end of the latch bolt when it enters and the clamps act.

Letters, $J^{29}$, are small self acting latch bolts projected by a concealed spring from recesses in the side of the mandrel bearings in the lower section of the sliding carriage and take into the recesses $J^{30}$, on the sides of the mandrels. The sides of the recesses in the mandrels and the sides of the end of the latch bolts, toward the driver, are inclined so as to offer but little resistance to the forward motion of the mandrel, the opposite sides being perpendicular, for the purpose of arresting the mandrel at the extremity of its back motion in order that the driver can be drawn back from it sufficiently to release it from its socket.

Letters $J^{31}$, represent cylindrical mandrels fitted to bearings in the interior of the square sliding mandrels and provided with a tool socket in the ends next to the chuck and also at the same ends with conical shoulder bearings $J^{32}$ fitted to reverse conical seats in the exterior mandrel.

$J^{33}$ are screw nuts on the other end of the interior mandrels for the purpose of keeping the internal mandrels in their seats and also for the purpose of carrying both the internal and external mandrels forward together when pushed by the driver.

The fourth part of my invention relates to the cutting tool, K, and consists in combining an adjustable drill with an adjustable facing tool. The office performed by the tool is to drill a hole in the fitting preparatory to the introduction of a tap, and also to countersink the edges of the hole and square the face of the joint. Besides the advantage gained by this adjustable tool of capacity to drill holes of different depths, and at the same time face the joint and countersink the hole, the unequal wear of the cutting edges of the tools can be compensated for by adjustment.

Letter K' represents the stem or holder of the drill $K^2$, and facing tool $K^3$, which are held together in the socket $K^4$, by the set screw, $K^5$, the arrangement of the drill, facing tool, socket and set screw permitting relative adjustment of the drill and facing tool. The stem K' fits a socket in the end of the internal mandrel in the square mandrel $J^7$.

The fifth part of my invention consists in alternating taps or dies with cutting tools in combination with four or more parallel mandrels arranged in combination with a chuck substantially as herein explained and for the purpose of finishing the screw joints of different sizes on the same fitting by the alternate use of drilling and turning, and screw cutting tools, and without the necessity of shifting or adjusting the tools in the mandrels or of removing the fitting from the chuck until finished.

The mandrel, $J^7$, carries a drill and facing tool, and the mandrel, $J^8$, a tap to follow it, the mandrel, $J^9$, carries a reducing and facing tool, and the mandrel, $J^{10}$, a die to follow it for the purpose of cutting an external screw thread. By adding to the number of pairs of mandrels and arming them alternately with cutting tools and taps the variation of size of the number of joints of a fitting may be increased. In general two or three variations of size in the joints of the same fitting is all that is required.

The sixth part of my invention relates to the means of moving the mandrels in the sliding carriage. It consists first in combining with the series of mandrels a driver common to them all and arranged so as to act on any one of the mandrels when in line with the spindle and chuck; second, in combining with the driver a means of rotating it and a means of holding its bearing in a fixed position so that it can only move longitudinally; third, in combination with the socket in the end of the driver a spring latch and releasing cam for the purpose of enabling the driver to bring back the mandrels to their places.

Letter O represents a square bar which I call a "driver" and which slides in the square aperture through the hollow spindle O'. In case the cutting tools are not desired to be rotated at all the spindle O' may be made a stationary bearing and the mechanism hereafter described for rotating the driver be dispensed with, as also the dual arrangement of the tool mandrels, but I prefer to use a slower motion in operating the taps and dies than is requisite for the proper operation of the cutting tools and also to rotate the tool instead of the fitting. For this purpose therefore I have arranged the driver to be rotated at pleasure of the operator and at a slower rate of motion than the chuck.

Letter, $O^2$, is a hand lever connected to the driver by a swivel joint, $O^3$.

$O^4$, is a step cone pulley fast to the spindle, O', and driven by a band from the step cone pulley, $C^9$, which runs loose on the countershaft C.

Letter, $O^5$, is a brake formed of two segments of an annular plate jointed together at, $O^6$, and forced apart so as to take against the inside surface of the periphery of the step cone pulley by the oval end $O^7$ of the shaft, $O^8$, which is connected by the arm, $O^9$, and connecting rod $O^{10}$ with a stud $O^{11}$ projecting from the side of the treadle $O^{12}$. The connecting rod $O^{13}$ connects the treadle, $O^{12}$, with the clutch shifter $C^{10}$ which governs the pulley $C^7$.

$O^{14}$ is an adjustable spring which presses up against the arm $O^9$ antagonistically to the action of the treadle. The brake is always kept against the inside surface of the pulley by the action of the spring, except when necessary to rotate the spindle and driver, when it is released by pressing down the treadle and at the same time the pulley, $C^7$, is coupled by the action of the clutch shifter with the step cone pulley for the purpose of imparting motion to the driver, the driver being permitted to rotate by reason of the swivel joint while being moved forward imparts rotary motion to the inner mandrel both mandrels going forward together. When the die or tap is run up too far the adjustable spring on the brake of the chuck permits the chuck to yield so as not to break the tap or strip the thread. To run back the tap a backward motion is given to the chuck by depressing the treadle $I^3$. I consider this employment of adjustable friction in combination with the chuck and tap or die for the purpose of permitting the tool to run up to its full extent and yet yield in time to save the thread or tool as an important feature in this part of my invention.

Letter P represents a latch sliding in slots in the socket P'; $P^2$ a spring acting on the latch; $p$, a stop on the latch; $p'$ a hook on the latch which takes into the eyes on the flat ends of the tool mandrels for the purpose of drawing them back to their places; P³ a projecting cam fast to the spindle O'. The office of this cam is to act on the latch when the driver is drawn nearly back to its place of rest in order to release it from the mandrels so that the driver by the remainder of its motion is withdrawn entirely from the mandrels.

The ends of the rotating tool mandrels being flatted and the socket of the driver being of a corresponding shape the tools will of course be rotated when connected with the driver whenever the driver is rotated and when the spindle through which the driver slides is held in a fixed position by the action of the brake both the external and internal mandrels become as one instrument and in connection with the driver perform the office of a slide rest simply to carry the tool forward against the fitting which is rotated by the spindle and chuck.

Finally my invention as a whole consists in combining together in a machine, a series of parallel mandrels carrying cutting tools, driver, sliding carriage and chuck substantially in the manner and for the purposes herein explained.

What I claim as my invention and desire to secure by Letters Patent of the United States is as follows, viz:

1. Interposing between the jaws and the body of the chuck spindles or joints substantially as described whereby the jaws may be turned on axes at right angles to the axis of the spindle and chuck for the purpose of preventing different parts of the fitting clamped between them to the action of the cutting tools substantially in the manner and for the purposes described.

2. In combination with the jaws of the chuck the adjusting screws substantially as described.

3. In combination with the jaws of the chuck the mechanism whereby they are clamped and locked together on the fitting at one operation, to wit, the cams, levers, and rack sliding bars substantially as described.

4. In combination with the cams operating the jaws of the chuck a collar wrench not removable from the chuck and spindle substantially as described.

5. In combination with the jaws of the chuck the indexes and self acting detents substantially as described.

6. In combination with the indexes and detents the locking cams or wedges substantially as described and when in connection with the chuck and jaws, substantially for the purposes herein set forth.

7. The chuck constructed substantially as described and containing the improvements separately specified in the 1st, 2nd, 3rd, 5th and 6th claims.

8. The combination of a friction brake directly with the chuck substantially as described.

9. The combination of the brake, chuck and clutch shifter or its equivalent, when so arranged as to communicate motion to the chuck spindle when the brake is released from the chuck substantially as described.

10. The sliding carriage and series of mandrels in combination with the spindle and chuck substantially as described.

11. The division plate, self acting clamp and releasing lever in combination with the sliding carriage substantially as described.

12. The latch bolts in the mandrel bearings in combination with the mandrels substantially as described.

13. Constructing the sliding carriage mandrels in two parts arranged and combined together substantially as and for the purposes described.

14. The combination of the adjustable drill with the adjustable facing tool constituting the cutting tool K substantially as described.

15. Alternating taps or dies with cutting tools in combination with two or more pairs of parallel mandrels arranged in combination with a chuck substantially as described.

16. The driver in combination with the sliding carriage and mandrels substantially as described.

17. In combination with the driver and spindle through which it slides the pulley, brake and clutch shifter substantially as described.

18. In combination with the mandrel socket of the driver, the spring latch and releasing cam substantially as described.

19. The employment of an adjustable friction plate in combination with the chuck and tap or die to hold the fitting against the action of the tap or die by a yielding pressure sufficient for the purpose of cutting the screw thread, but yielding to prevent stripping the thread or breaking the tap when requisite, substantially as described.

20. Combining together in one machine, a series of parallel mandrels carrying cutting tools, driver, sliding carriage and chuck, substantially as described and arranged so as to operate substantially in the manner and for the purposes set forth.

JAS. W. LYON.

Witnesses:
H. EAGLE,
GEO. A. LLOYD.